(12) United States Patent
Umetsu

(10) Patent No.: US 7,999,511 B2
(45) Date of Patent: Aug. 16, 2011

(54) BATTERY CHARGER

(75) Inventor: Koji Umetsu, Miyagi (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 12/114,343

(22) Filed: May 2, 2008

(65) Prior Publication Data

US 2008/0290834 A1 Nov. 27, 2008

(30) Foreign Application Priority Data

May 22, 2007 (JP) ................. 2007-135466

(51) Int. Cl.
*H02J 7/00* (2006.01)
*H02J 7/10* (2006.01)
*H02J 1/12* (2006.01)
*H02J 3/32* (2006.01)
*H02J 3/34* (2006.01)

(52) U.S. Cl. ........ 320/128; 320/116; 320/117; 320/132; 320/134; 307/43; 307/45; 307/46

(58) Field of Classification Search ............. 320/128
See application file for complete search history.

(56) References Cited

U.S. PATENT DOCUMENTS

| 6,005,371 | A | 12/1999 | Umetsu |
| 7,446,432 | B2 * | 11/2008 | Cha ................. 307/64 |
| 7,550,873 | B2 * | 6/2009 | Jiang et al. ............ 307/64 |
| 7,688,021 | B2 * | 3/2010 | Freiman et al. ........... 320/101 |
| 2004/0189253 | A1 | 9/2004 | Tanabe et al. |
| 2007/0296376 | A1 * | 12/2007 | Marquet et al. .......... 320/101 |
| 2009/0051323 | A1 * | 2/2009 | Sato et al. ............. 320/134 |

FOREIGN PATENT DOCUMENTS

| JP | 06-067767 | 3/1994 |
| JP | 08-070538 | 3/1996 |
| JP | 10-234139 | 9/1998 |
| JP | 3128167 | 11/2000 |
| JP | 2001-186668 | 7/2001 |
| JP | 2004-304941 | 10/2004 |

OTHER PUBLICATIONS

Japan Office Action corresponding to 2007-135466 dated Mar. 10, 2009.

* cited by examiner

*Primary Examiner* — Edward Tso
*Assistant Examiner* — Ahmed Omar
(74) *Attorney, Agent, or Firm* — K&L Gates LLP

(57) ABSTRACT

A battery charger for charging a plurality of secondary batteries is provided. The charger is configured to be connected to a power supply circuit and configured so that an output of the circuit is connected to the batteries. The battery charger includes a first switch for connecting the batteries in series, a second switch to selectively connect a first polarity terminal of a first secondary battery having a highest electric potential, a DC-DC converter having a first and second polarity input terminals, the first polarity input terminal being to be connected to the first polarity terminal via the second switch, the second polarity input terminal being to be connected to a second polarity terminal of a second secondary battery having a lowest electric potential, an external power supply output terminal connected to an output terminal of the DC-DC converter, and a controller for controlling the first and second switches.

5 Claims, 7 Drawing Sheets

BATTERY CHARGER

CROSS-REFERENCE TO RELATED APPLICATIONS

The present application claims priority to Japanese patent Application No. 2007-135466 filed in the Japanese Patent Office on May 22, 2007, the entire disclosure of which is incorporated herein by reference.

BACKGROUND

The present disclosure relates to a battery charger capable of charging a battery pack of a secondary battery and outputting a stable direct-current power supply to an external power supply output terminal.

A battery charger for charging a secondary battery by using a commercial power supply has been known. In addition to the charging function, an use range of the battery charger may be widened if the electric power charged to the secondary battery can be used as an external direct-current (hereinafter referred to as "DC") power supply. The inventor of the invention has proposed a battery charger disclosed in Japanese Unexamined Patent Application Publication No. Hei 10-234139.

FIG. 7 shows a configuration of the battery charger disclosed in Japanese Unexamined Patent Application Publication No. Hei 10-234139. A commercial alternating-current (hereinafter referred to as "AC") power supply is converted to a DC power supply by an input filter 11 and a rectifier circuit 12. A switching power supply includes a pulse width modulation control circuit 13, a transistor Q11, and a transformer T1. The transistor Q11 which functions as a switching element switches, for example, at 100 kHz by an output pulse of the pulse width modulation control circuit 13. Rectified outputs from a diode D11 and a capacitor C11 which are connected to a tertiary winding N3 of the transformer T1 are supplied as a power source of the pulse width modulation control circuit 13.

Current flowing in a primary winding N1 is controlled by the transistor Q11, and electric power is induced in a secondary winding N2 and the tertiary winding N3. A voltage induced in the secondary winding N2 is rectified by a diode D12 and a capacitor C12, and the rectified output Vo is supplied to a charge control circuit 23 via output terminals 21 and 22. Also, the output is subject to resistance voltage division by a resistor R21 and a resistor R22, and thereafter inputted to a minus terminal of an operation amplifier AMP1. On the other hand, a reference voltage REF1 is inputted to a plus terminal of the operation amplifier AMP1, and an error signal detected by comparing the output voltage Vo and the reference voltage is connected to a photocoupler PH1 via a diode D13.

A voltage higher than the output voltage Vo is induced from a winding N22 of the transformer T1, and the induced voltage is rectified by a diode D15 and a capacitor C13 so that an output thereof is supplied to the photocoupler PH1 via a resistor. An error signal transmitted from a second side to a first side of the photocoupler PH1 is supplied to the pulse width modulation control circuit 13. The circuit 13 controls ON time period of an output pulse of the transistor Q11 and controls an electric power to be supplied to the second side such that an output voltage set by a reference voltage at the second side may be derived.

While an output current Io is supplied to a load circuit, the amount of current is detected by a resistor R12, and the detected current is inputted to a minus terminal of an operation amplifier AMP2. A reference voltage REF2 is supplied to a plus terminal of the operation amplifier AMP2, and a voltage of a plus terminal of the operation amplifier AMP2 is increased by an amount corresponding to that of the reference voltage. The flowing of output current Io causes a voltage drop of the resistor R12 due to the output current, and consequently, the reference voltage causes a voltage drop to a minus direction. Thus, when the amount of load current is increased, a voltage of a plus terminal of the operation amplifier AMP2 connected to the reference voltage REF2, goes down.

In this manner, a voltage of a plus terminal of the operation amplifier AMP2 goes down in accordance with the amount of currents flowing in the resistor R12 and the resultant voltage is compared with a voltage of a minus terminal. The operation amplifier AMP2 compares the amount of currents set by the reference voltage REF2 with the amount of currents flowing in the resistor R12, and an error signal detected by the comparison is inputted to the photocoupler PH1 via a diode D14. The error signal of the output current is provided to the pulse width modulation control circuit 13 as similar with the case of voltage control described above. Thus, the pulse width modulation control circuit 13 at the first side controls ON time period of the transistor Q11 such that the output current Io becomes a predetermined amount of current set by the reference voltage REF2.

In this manner, the operation amplifier AMP1 controls the output voltage Vo to be a predetermined voltage, and the operation amplifier AMP2 controls the output current Io to be a predetermined amount of current. The voltage outputted from the power supply device is supplied to the charge control circuit 23.

A configuration of the charge control circuit 23 is shown in FIG. 8. The charge control circuit is adapted to charge batteries BAT 21 and BAT 22 of nickel-metal-hydride secondary batteries. A plus terminal 21 of the power supply device is connected to the respective emitters of transistors Q21 and Q22, and the respective collectors of the transistors are connected to positive electrodes of the batteries BAT21 and BAT22. A minus terminal of the power supply device is connected to negative electrodes of batteries BAT21 and BAT22.

Outputs CH1 and CH2 of a controller 24 which includes a microcomputer, control switching of transistors Q21 and Q22 respectively so that charge currents are alternately supplied to the batteries BAT21 and BAT22, as shown in FIG. 9. In other words, when the transistor Q21 is in ON state and the transistor Q22 is in OFF state, charge currents flow to the battery BAT21, and when the transistor Q21 is in OFF state and the transistor Q22 is in ON state, charge currents flow to the battery BAT22.

Battery voltages of the batteries BAT21 and BAT22 are supplied to inputs AD1 and AD2 of an A/D converter of the controller 24, and the battery voltages converted to digital data are detected by the controller 24. Further, the controller 24 lights a charge display such as a LED 25 during charging. A voltage Vcc generated by the power supply device is supplied to the controller 24 as a power supply voltage via a regulated power supply circuit 27.

FIG. 10 shows typical variations of a voltage V and a current I of a nickel-metal-hydride secondary battery during charging. As the charging comes to the end, changes in a charge voltage peculiar to a nickel-metal-hydride secondary battery, such as an abrupt rise of voltage occurs and a voltage drops thereafter, occur. The voltage drop is typically express as −Δ, and the completion of charging is determined by detecting −ΔV which is voltage drop of a few mV.

A battery charger disclosed in Japanese Unexamined Patent Application Publication No. Hei 10-234139 can charge a secondary battery, and also output a DC power supply for an external load. In this example, since a voltage of a secondary battery itself can be externally outputted, power supply can be provided in case of a power failure of the commercial power supply, but adversely overdischarge of a battery may be caused. Further, a nominal voltage of a nickel-metal-hydride battery is as low as around 1.2V, and therefore, even though a voltage is derived as an external power supply, the power supply may be unstable and its use range may be limited.

Japanese Unexamined Patent Application Publication No. 2004-304941, discloses a battery charger in which a battery is charged by an AC-DC conversion circuit and DC outputs are outputted externally. In other words, in the Japanese Unexamined Patent Application Publication No. 2004-304941, while an output from an AC-DC conversion circuit is externally outputted from a DC output circuit via a backflow prevention diode, an output from a battery is combined at the DC output circuit via a DC-DC conversion circuit.

Japanese Unexamined Patent Application Publication No. 2004-304941 discloses a configuration in which an output subjected to an AC-DC conversion charges a battery and is outputted externally. When a nickel-metal-hydride secondary battery or a lithium-ion secondary battery is charged, it is difficult to obtain a stable voltage required for an output of an AC-DC conversion circuit due to the change of the battery voltages.

Further, with respect to a nickel-metal-hydride secondary battery and a lithium-ion secondary battery, Japanese Unexamined Patent Application Publication No. 2004-304941 does not disclose specific numbers of battery cells constituting the batteries, and connection types of a plurality of batteries. For example, a battery voltage per a single cell of the nickel-metal-hydride secondary battery is as low as 1.0V to 1.4V, therefore, it is very difficult to stably operate a DC-DC converter at the battery voltage value, and unstable operation may be caused.

In the Japanese Unexamined Patent Application Publication No. 2004-304941, a secondary battery is connected to a DC-DC converter with no AC input, and therefore, a battery is consumed by constant operation of the DC-DC converter. Even if an output current from the DC-DC converter is zero, consumption of the battery may be caused due to consumption currents by DC-DC converter operations.

Therefore, it is desirable to provide a battery charger having an external DC power supply output, capable of outputting a stable DC power supply, capable of obtaining desired DC power supply outputs even if a secondary battery of a low battery voltage is used, and capable of reducing consumption currents of a battery.

SUMMARY

The present disclosure is in view of the issues. In accordance with an embodiment, there is provided a battery charger for charging a plurality of secondary batteries, the battery charger being configured to be connected to a power supply circuit for converting an AC input to a DC output, and configured so that an output of the power supply circuit is connected to the plurality of secondary batteries. The battery charger includes a first switch for connecting a plurality of secondary batteries in series, a second switch to selectively connect a first polarity terminal of a first secondary battery having a highest electric potential out of the secondary batteries connected in series, a DC-DC converter, an external power supply output terminal connected to an output terminal of the DC-DC converter to derive a stable power supply, and a controller for controlling the first and second switches. The DC-DC converter has a first polarity input terminal and a second polarity input terminal. The first polarity input terminal is configured to be connected to the first polarity terminal via the second switch. The second polarity input terminal is configured to be connected to a second polarity terminal of a second secondary battery having the lowest electric potential of the secondary batteries connected in series.

In accordance with another embodiment, there is provided a battery charger for charging a plurality of secondary batteries and deriving a DC power generated by a DC-DC converter to an external DC power supply terminal, the battery charger being configured to be connected to a power supply circuit for converging an AC input to a DC output, configured so that an output of the power supply circuit is connected to the secondary batteries. The battery charger is configured to control by processings which include the steps of determining a presence of absence of AC input, upon the determination of the presence of AC input, determining whether an operation of the DC-DC converter is turned ON or not, if the DC-DC converter is determined to be turned ON, supplying a DC power generated in the power supply circuit to an input terminal of the DC-DC converter and outputting an output power supply of the DC-DC converter to the external DC power supply terminal, upon the determination of the absence of AC input, determining whether an operation of the DC-DC converter is turned ON or not, if the DC-DC converter is determined to be turned ON, supplying a voltage of the highest electric potential of the plurality of secondary batteries connected in series to an input terminal of the DC-DC converter and outputting an output power supply of the DC-DC converter to the external DC power supply terminal, detecting a completion of discharging of the plurality of secondary batteries, and upon a detection of the completion of discharging, stopping output of an output power supply of the DC-DC converter and operation of the DC-DC converter.

In embodiments, an AC-DC converted output and an output are derived from a secondary battery to an external DC power supply output terminal via a DC-DC converter to allow supply of a stable DC power. Accordingly, in addition to charge functions, electric power stored in a secondary battery may be used as an external DC power supply.

Further, in embodiments, a plurality of secondary batteries are connected in series and a battery voltage of the highest electric potential is supplied to the DC-DC converter to obtain an external DC power supply, therefore the DC-DC converter may be operated stably. For example, if a single nickel-metal-hydride secondary battery is used, the output is limited to a low battery voltage, so that the normal operation of the DC-DC converter is not possible. According to embodiments, a voltage enabling operation of the DC-DC converter may be generated by connecting the batteries in series.

Furthermore, in embodiments, switches are provided to an input and an output of the DC-DC converter to control operation or the like of the DC-DC converter in conjunction with ON/OFF of a DC power supply output. Accordingly, consumption of a secondary battery may be reduced.

Additional features and advantages are described herein, and will be apparent from the following Detailed Description and the figures.

DETAILED DESCRIPTION

Figure 1A:
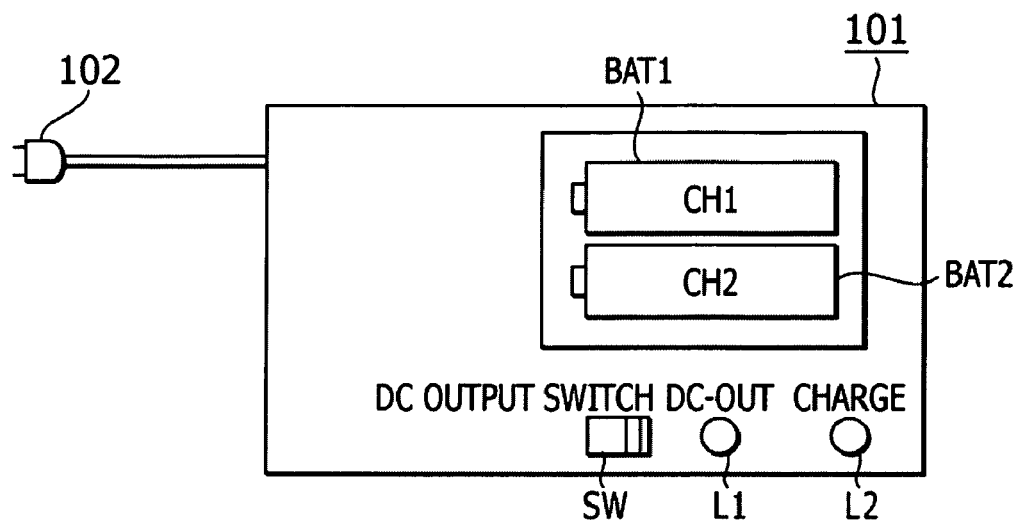
FIGS. 1A and 1B are a plan view and a side view showing the exterior of the battery charger according to an embodiment, respectively.

An embodiment is described below. With reference to FIG. 1, external view of a battery charger in an embodiment is described. As shown in FIG. 1A, a plurality of secondary batteries, for example, two nickel-metal-hydride secondary batteries having the same battery capacity, a BAT 1 and a BAT 2 are provided in a battery housing located on an upper surface of a case of a battery charger 101. A power supply unit and a charge control circuit are housed in the case and the battery charger 101 receives a commercial power supply via a power supply cable and a power supply plug 102. Accordingly, the secondary batteries BAT 1 and BAT 2 are charged by the power supply unit and the charge control circuit, as described later.

The upper surface of the battery charger 101 is provided with a mechanical switch SW which uses a manual mechanical switch such as a tactile switch, and light-emitting elements L1 and L2. The mechanical switch SW functions to switch between output and non-output of DC. The light-emitting elements L1 and L2 are formed of LED, and light emission state of the light-emitting element L1 is controlled in response to a discharging state, and light emission of the light-emitting element L2 is controlled in response to a charging state.

Figure 1B:
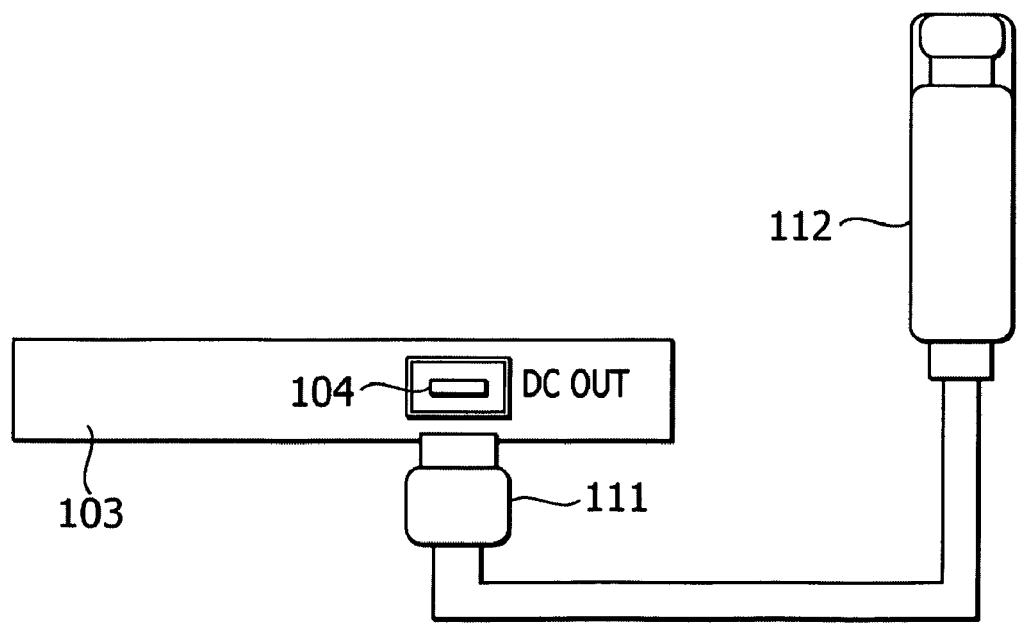

As shown in FIG. 1B, a side surface 103 of the battery charger 101 is provided with a USB port 104 which serves as an external DC power supply output terminal. A USB plug 111 is connected to the USB port 104 to provide a DC power supply to a portable music player 112, whereby charging of secondary batteries in the portable music player 112 becomes possible. In this case, the use is limited to a terminal of a power supply of the USB plug, and a communication terminal is not used. Further, the portable music player 112 is just an example, and secondary batteries of other devices such as a mobile phone may be charged. In an embodiment, the external DC power supply output terminal is not limited to the USB port, but may be a circular DC output or a connector having a dedicated shape.

A DC output is typically in a state of stopping in order to prevent capacity reduction caused by discharging of the batteries BAT 1 and BAT 2. The mechanical switch SW is turned ON to generate DC output when DC output is required. As described later, the mechanical switch SW is provided to control the operation of the DC-DC converter and output from the USB port 104 which serves as the external DC power supply output terminal.

In this way, since the battery charger 101 has the USB port 104, the charger serves devices such as a mobile phone and a portable music player, even when a commercial power supply as a power supply for charging and operating the devices is not available. Accordingly, usability for an user may be improved.

Figure 2:
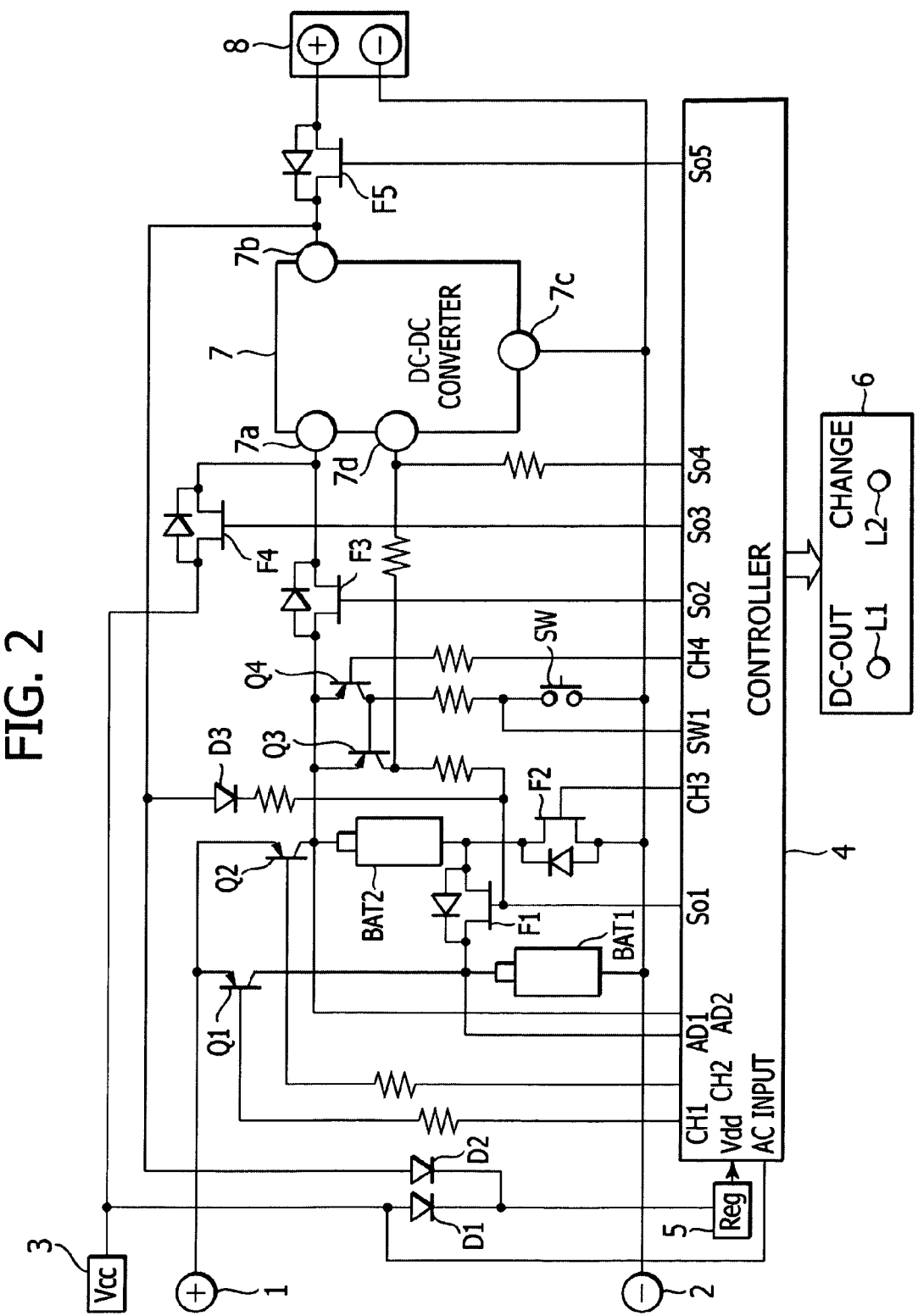
FIG. 2 is a wiring diagram showing an example of a charge control circuit according to an embodiment.
Figure 7:
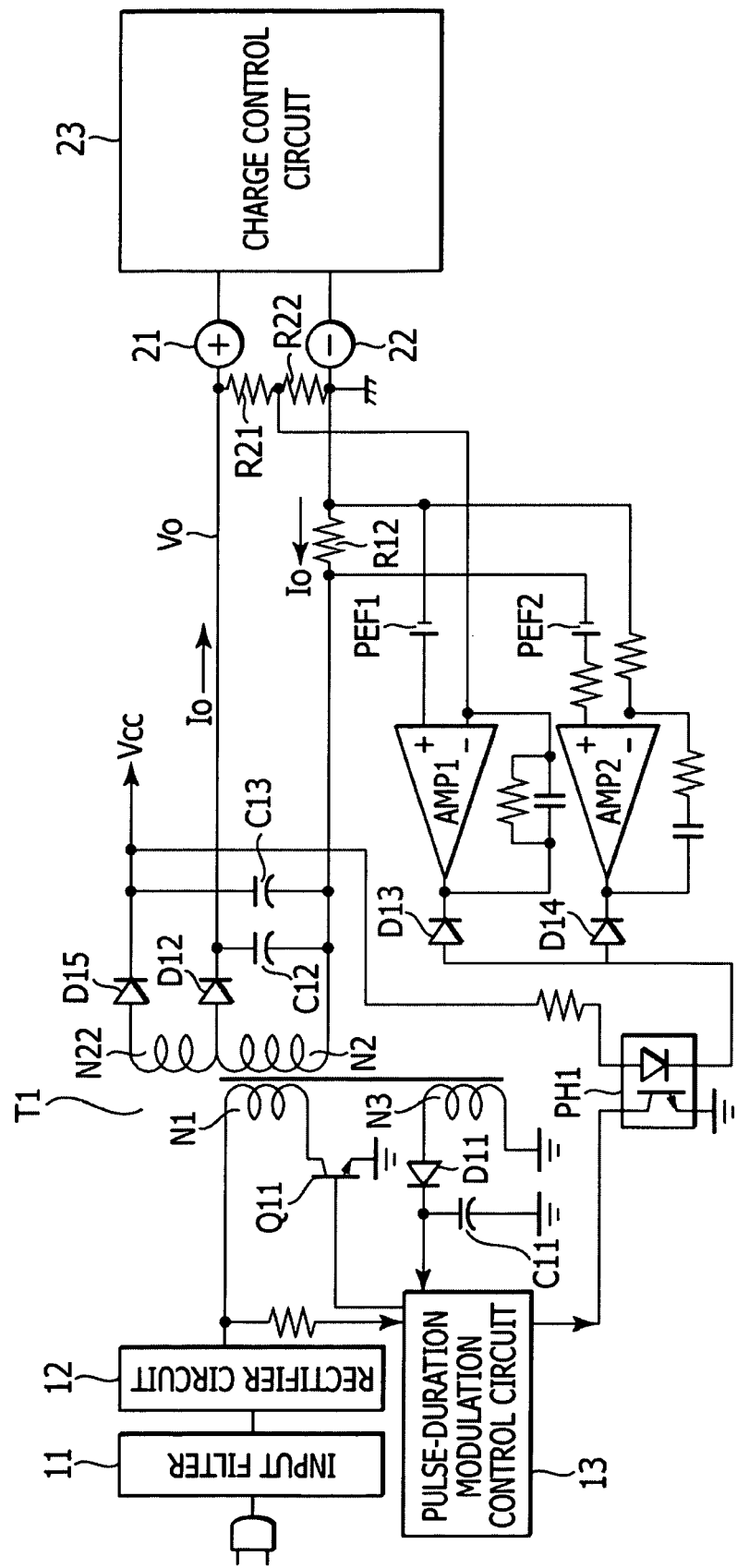
FIG. 7 is a wiring diagram showing an example of a configuration of a known power supply circuit.
Figure 8:
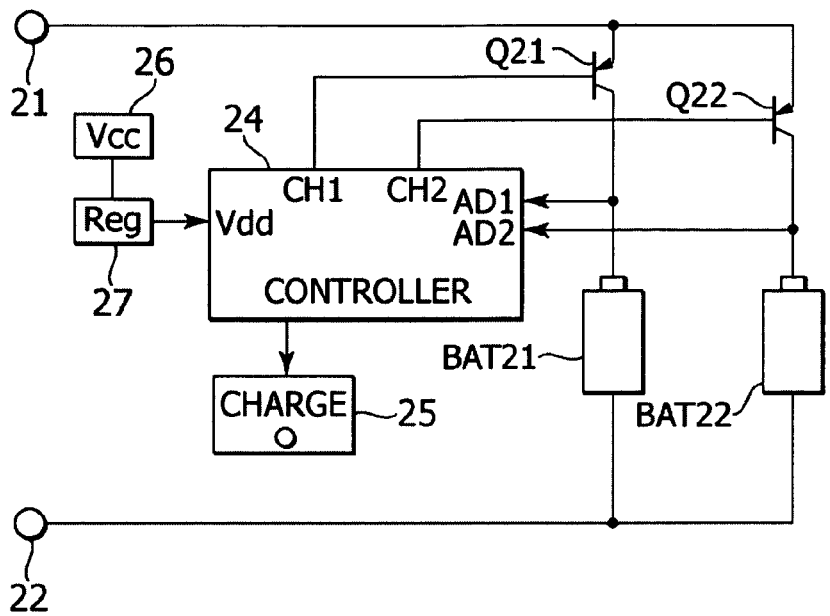
FIG. 8 is a wiring diagram showing an example of a configuration of a known charge control circuit.

A configuration of a charge control circuit according to an embodiment is shown in FIG. 2. A DC power generated by a power supply circuit is inputted to a plus side input terminal 1 and a minus side input terminal 2, and a DC voltage Vcc is inputted to an input terminal 3. A configuration in which the commercial power supply is converted to the DC power supply by a switch power supply circuit, as proposed in the description of the FIG. 7, may be applied to the power supply circuit in FIG. 2. Alternatively, power supply circuits of other configurations may be used.

A controller 4 having a microcomputer controls operations of transistors, field-effect transistors, and the like of the charge control circuit by performing predetermined sequences. An operating power supply is supplied from a regulated power supply circuit 5 to the controller 4. The regulated power supply circuit 5 is supplied with the power supply voltage Vcc via a diode D1 and a DC voltage outputted from a terminal 7b of a DC-DC converter 7 (described later) is supplied via a diode D2. Further, the power supply voltage Vcc is supplied to the controller 4 to detect the presence or absence of an AC input.

The controller 4 controls a display 6, and the display 6 includes light-emitting elements L1 and L2. The DC-DC converter 7 includes an input terminal 7a, an output terminal 7b, a ground terminal 7c, and an ON (operated)/OFF (non-operated) control terminal 7d. For example, a boost DC-DC converter 7 (generate an output voltage higher than an input voltage) is used. Under high level of the ON/OFF control terminal 7d, the DC-DC converter 7 operates, and under low level of the terminal 7d, the DC-DC converter stops the operation.

A DC output voltage generated at the DC-DC converter 7, for example 5V, is derived through an external DC power supply output terminal 8 via a P channel (hereinafter referred to as "Pch") field-effect transistor F5 (hereinafter referred to as "FET-F5"). An example of the external DC power supply output terminal 8 is the USB port.

The secondary batteries BAT1 and BAT2 are, for example, nickel-metal-hydride secondary batteries, and positive electrodes of the both batteries are respectively connected to the plus side input terminal 1 via PNP transistors Q1 and Q2. A negative electrode of the battery BAT 1 is connected to the minus side input terminal 2, and a negative electrode of the battery BAT 2 is connected to the minus side input terminal 2 via a N channel (hereinafter referred to as "Nch") FET-F2. The Nch FET-F1 is connected between a positive electrode of the battery BAT 1 and a negative electrode of the battery BAT 2.

Figure 9:
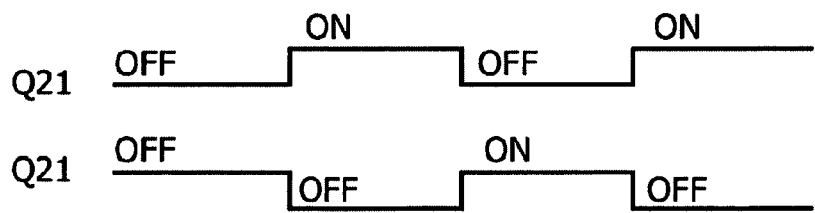
FIG. 9 is a timing chart showing operations of a known charge control circuit.
Figure 10:
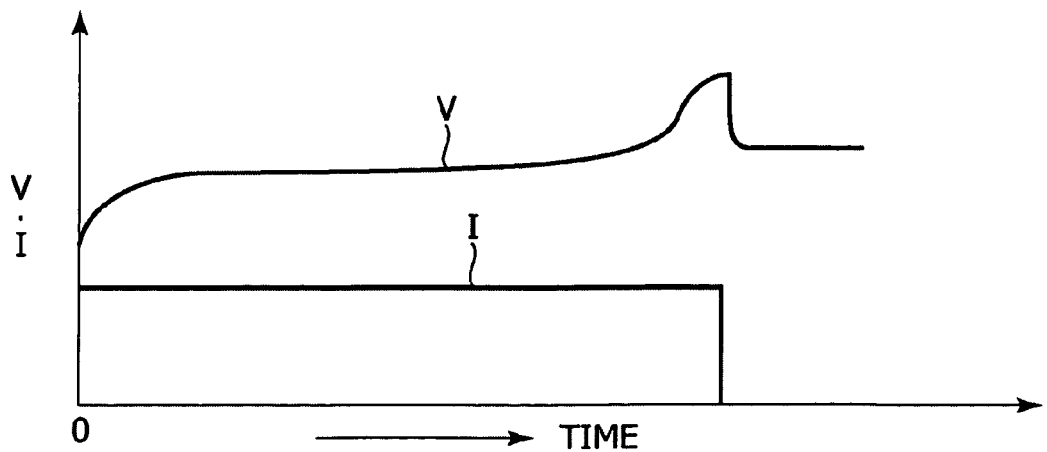
FIG. 10 is a rough line drawing showing an example of variations of a voltage and a current when a nickel-metal-hydride secondary battery is charged.

The FET-F1 and the FET-F2 are controlled by outputs So1 and CH3 of the controller 4. Under the OFF state FET-F1 and the ON state FET-F2, the outputs CH1 and CH2 of the controller 4 are supplied to bases of the transistors Q1 and Q2, and as similar with the example of FIG. 9, a charge current is alternately supplied to the secondary batteries BAT1 and BAT2 to charge the secondary batteries.

Respective voltage of positive electrodes of the secondary batteries BAT 1 and BAT 2 are supplied to the inputs AD1 and AD2 of an A/D converter of the controller 4 so that the voltages are measured by the controller 4. The DC voltage Vcc is inputted to the controller 4 to detect the presence or absence of the AC power supply.

Under a state where the FET-F1 is in ON state and the FET-F2 is in OFF state, the batteries BAT1 and BAT2 are connected in series. A positive electrode of the secondary battery BAT2, which is the highest electric potential of the batteries BAT1 and BAT2 connected in series, is connected to the input terminal 7*a* of the DC-DC converter 7 via a Pch FET-F3.

A positive electrode of the battery BAT2 is connected to the respective emitters of PNP transistors Q3 and Q4. A collector of the transistor Q4 is connected to a base of the transistor Q3 and also connected to the minus side input terminal 2 via a resistor and the mechanical switch SW. An output CH4 of the controller 4 is inputted to a base of the transistor Q4, and a midpoint of a wiring connecting a resistor and the mechanical switch SW is inputted to the controller 4 as a signal SW1.

A collector of the transistor Q3 is connected to a gate of the FET-F1 via a resistor, and also to the ON/OFF control terminal 7*d* of the DC-DC converter 7.

When the mechanical switch SW is turned ON, a base of the transistor Q3 becomes low level to turn ON the transistor Q3. In addition, a gate voltage of the FET-F1 is raised to turn ON the FET-F1. Consequently, a positive electrode of the battery BAT1 and a negative electrode of the battery BAT2 are connected in series with the FET-F1 in between. In this case, the output CH3 of the controller 4 controls the FET-F2 to be the OFF state.

In this way, series connection between the batteries BAT1 and BAT2 is controlled by the FET-F1, and a gate-source voltage of the FET-F1 is controlled by a voltage of the battery BAT2. When a gate ON voltage of the FET-F1 is 1.0V and a voltage of the battery BAT2 is 1V or above, the FET-F1 is turned ON, and when a voltage of the battery BAT2 is, for example, 0.9V or less, which indicates a state that the voltage is at discharged state, the FET-F1 cannot be turned ON. Thus, overdischarge of the batteries BAT1 and BAT2 can be prevented.

A gate of the FET-F1 is connected to the output terminal 7*b* of the DC-DC converter 7 via a resistor and a diode D3. Consequently, when the DC-DC converter 7 is in a state of operation, an output voltage (for example, 5V) of the DC-DC converter is applied to a gate of the FET-F1 to raise a gate voltage of the FET-F1. As a result, the FET-F1 is adequately turned ON to arrange an ON resistance of the FET-F1 to be minimum.

A between the emitter and the collector of the transistor Q4 is connected between the emitter and the base of the transistor Q3, and the transistor Q3 is prevented from being turned ON by turning ON the transistor Q4. The transistor Q4 is turned ON by the output CH4 of the controller 4 when a commercial power supply is inputted, whereby the transistor Q3 can be prevented from being turned ON.

The FET-F3 is connected between a positive electrode serially connected battery BAT2 and the input terminal 7*a* of the DC-DC converter 7. The FET-F3 is controlled to be turned ON by supply of an output So2 of the controller 4 to a gate (of the FET-F3), when the DC-DC converter 7 becomes operative with no input of a commercial power supply (to the transistor).

On the other hand, the input terminal 7*a* of the DC-DC converter 7 is connected to the Vcc terminal 3 of a power supply output via the Pch FET-F4. The FET-F4 is controlled to be turned ON by supply of an output So3 of the controller 4 to a gate of the FET-F4 when the DC-DC converter 7 becomes operative with input of the commercial power supply (to a transistor).

As described above, the DC-DC converter 7 in the operative state receives a DC input by turning ON either the FET-F3 or the FET-F4 depending on the presence or absence of a commercial power supply.

A power supply voltage to be supplied to the controller 4, such as 2.5V is generated by the regulated power supply circuit 5. When a commercial power supply is connected, the output voltage Vcc of the power supply circuit is supplied to the regulated power supply circuit 5 via the diode D1. A voltage outputted from the output terminal 7*b* of the DC-DC converter 7 is supplied to the regulated power supply circuit 5 via the diode D2. Accordingly, when a commercial power supply is not connected, an output voltage of the DC-DC converter 7, for example 5V, is supplied to the regulated power supply circuit 5 via the diode D2. Hence, an operating voltage of the controller 4 is stably supplied by the regulated power supply circuit 5.

The ON/OFF control terminal 7*d* of the DC-DC converter 7 is connected to a collector of the transistor Q3 via a resistor. Under no connection of a commercial power supply, the transistor Q3 is turned ON (the transistor Q4 is in OFF state) when the mechanical switch SW is turned ON, and a high level voltage is inputted to the ON/OFF control terminal 7*d* from a collector of the transistor Q3.

Upon application of a high level voltage to the ON/OFF control terminal 7*d* of the DC-DC converter 7, the DC-DC converter 7 starts an operation, and a stable voltage is supplied from the output terminal 7*b* of the DC-DC converter 7 to the controller 4 via the diode D2 and the regulated power supply circuit 5. The controller 4 is activated in response to a supply of a voltage, and an output So4 (a high level voltage) of the controller 4 is supplied to the ON/OFF control terminal 7*d* of the DC-DC converter 7. The operation of the DC-DC converter 7 continues even if the transistor Q3 is turned OFF by the switch SW.

As described above, when a commercial power supply is inputted, a charge current is alternately supplied from the transistors Q1 and Q2 to the batteries BAT1 and BAT2 for charging the batteries. Further, by turning ON the switch SW to start ON state of the DC-DC converter 7, the signal SW1 to be inputted to the controller 4 becomes low level, whereby an operation of the DC-DC converter 7 is started. At this stage, the FET-F4 becomes ON state, and a DC input is supplied from the Vcc terminal 3 of the power supply circuit to the input terminal 7*a* of the DC-DC converter 7.

On the other hand, if a commercial power supply is not inputted, the transistor Q3 and the FET-F1 are turned ON by turning ON the mechanical switch SW, whereby the battery BAT1 and BAT2 come to be connected in series. Further, a high level voltage is applied to the ON/OFF control terminal 7*d* of the DC-DC converter from a collector of the transistor Q3, so that the DC-DC converter 7 becomes an ON state.

A DC voltage of a positive electrode of the battery BAT2 connected in series is supplied to the input terminal 7*a* of the DC-DC converter 7 via the FET-F3, and an output is generated from the DC-DC converter 7. As a result, the output is supplied to the controller 4 via the diode D2 and the regulated power supply circuit 5, whereby the controller 4 is activated. Arrangement is made to prevent a loss of the FET-F3, even if the FET-F3 is turned ON by the controller 4 and power consumption of the DC-DC converter 7 is increased. A delay time is provided for a timing at which the FET-F3 is turned ON, so that the FET-F5 is turned ON. Accordingly, a DC voltage, for example 5V, is outputted from the external DC output terminal 8.

Figure 3:
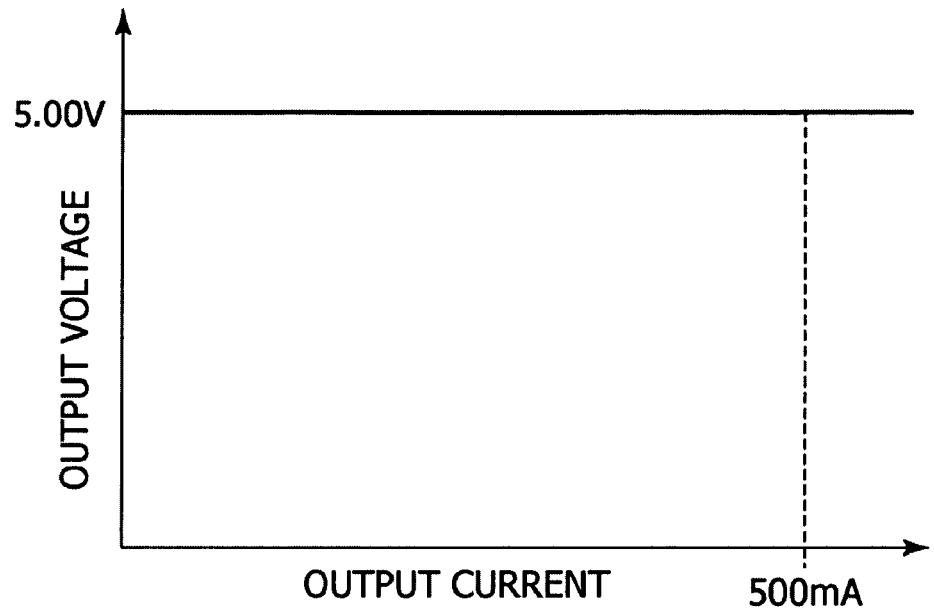
FIG. 3 is a rough line drawing showing an example of DC output characteristics according to an embodiment.

FIG. 3 shows an example of output characteristics of the DC-DC converter 7 in which the external DC power supply output terminal 8 is a USB port. An output voltage is controlled to be a constant voltage of 5V. Further, a vertical dotted line in the FIG. 3, which indicates an output current of 500 mA, shows a property example of a case where an output current is controlled by a constant current of 500 mA and a voltage is dropped. The constant current characteristic is a characteristic in the case of performing a protection so as to prevent inflows of overcurrent to devices to be connected to an USB port.

Figure 4:
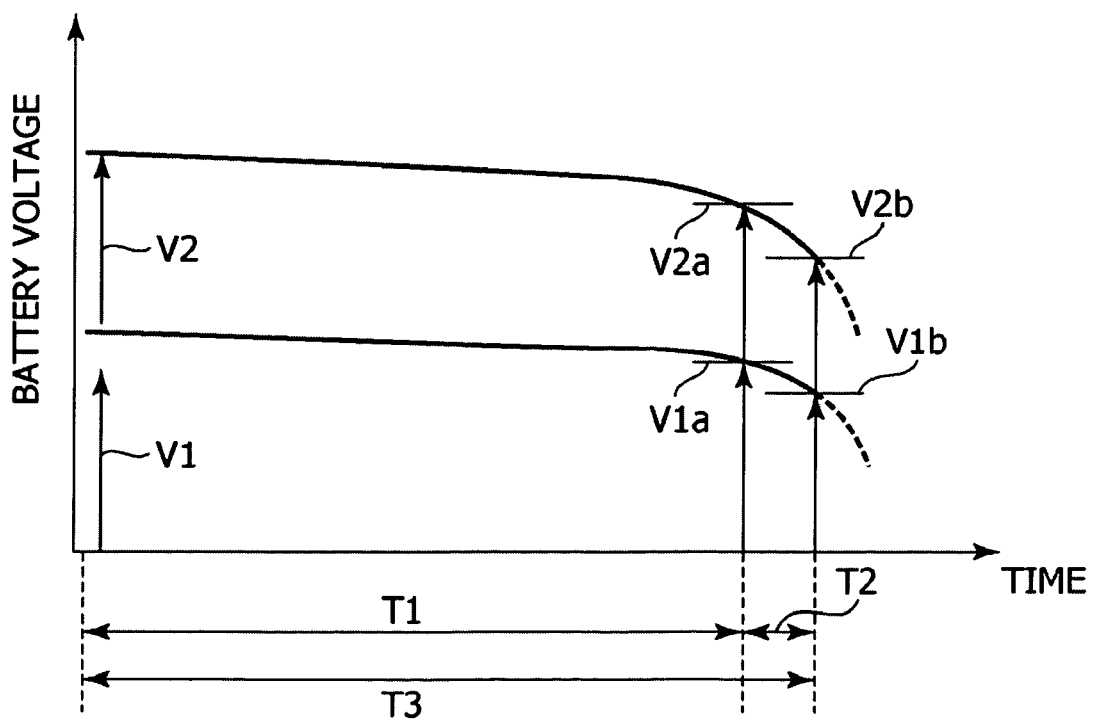
FIG. 4 is a rough line drawing showing an example of discharge characteristics of a battery according to an embodiment.

FIG. 4 shows an operation of detecting a completion of battery discharging according to an embodiment. The controller 4 monitors capacities of the batteries BAT1 and BAT2 connected in series and controls such that operation is stopped in order to prevent overdischarge when the discharge is completed. The batteries BAT1 and BAT2 are discharged while the DC-DC converter 7 is operated. Voltages of positive electrodes of the batteries BAT1 and BAT2 are supplied to the inputs AD1 and AD2 of an A/D converter of the controller 4, respectively, and the voltages are detected by the controller 4.

By representing a voltage of a positive electrode of the battery BAT1 as V1 and a voltage of a positive electrode of the battery BAT2 as V2, respective voltage of the batteries BAT1 and BAT2 are expressed by the following equations;

$$V1 \text{(a voltage of BAT1)} = AD1$$

$$V2 \text{(a voltage of BAT2)} = AD2 - AD1 - EV$$

In the equation, EV represents a voltage drop caused by an ON resistance of the FET-F1. Accordingly, the total voltages of the batteries BAT1 and BAT2 connected in series may be arranged by adjusting the voltage drop EV by the controller 4.

A battery voltage of a full charged state nickel-metal-hydride secondary battery is ranging from around 1.3V to 1.4V, and the battery voltage drops as discharge of the battery proceeds. A vertical axis of FIG. 4 shows changes in voltages V1 and V2 of each battery in parallel. When either the battery voltages V1 or V2 becomes lower than set threshold value voltages V1$a$ and V2$a$, for example 1.05V, the controller 4 determines as discharging of the battery is almost completing. When the battery is further discharged, and either the battery voltages V1 or V2 becomes lower than set threshold value voltages V1$b$ and V2$b$, for example 0.9V, the controller 4 determines as discharging is completed.

During a time period T1 from when a battery is determined to be full charged state to when discharging of the battery is determined to be almost completing, the light emitting element L1 of the display 6 continuously emits light. During a time period T2 from when a battery is determined to be almost at the end of discharging to when the end of discharging is detected, the controller 4 controls the display 6 such that the light emitting element L1 blinks. The DC-DC converter 7 operates during a time period T3, which includes both time periods T1 and T2, and stops operation when the completion of discharging is detected.

When the completion of discharging is detected, the FET-F5 connected between the output terminal 7$b$ of the DC-DC converter 7 and the external DC power supply output terminal 8 is turned OFF to stop an output of a power supply from the external DC power supply output terminal 8. Upon elapse of predetermined delay time after turning OFF of the FET-F5, an operation of the DC-DC converter 7 is stopped. By stopping the operation of the DC-DC converter 7, an operation voltage of the controller 4 supplied from an output of the DC-DC converter 7 becomes OFF state. Accordingly, an operation of the controller 4 is stopped and a circuit is completely disabled so that discharging of the batteries BAT1 and BAT2 is completely OFF to prevent overdischarge.

Figure 5:
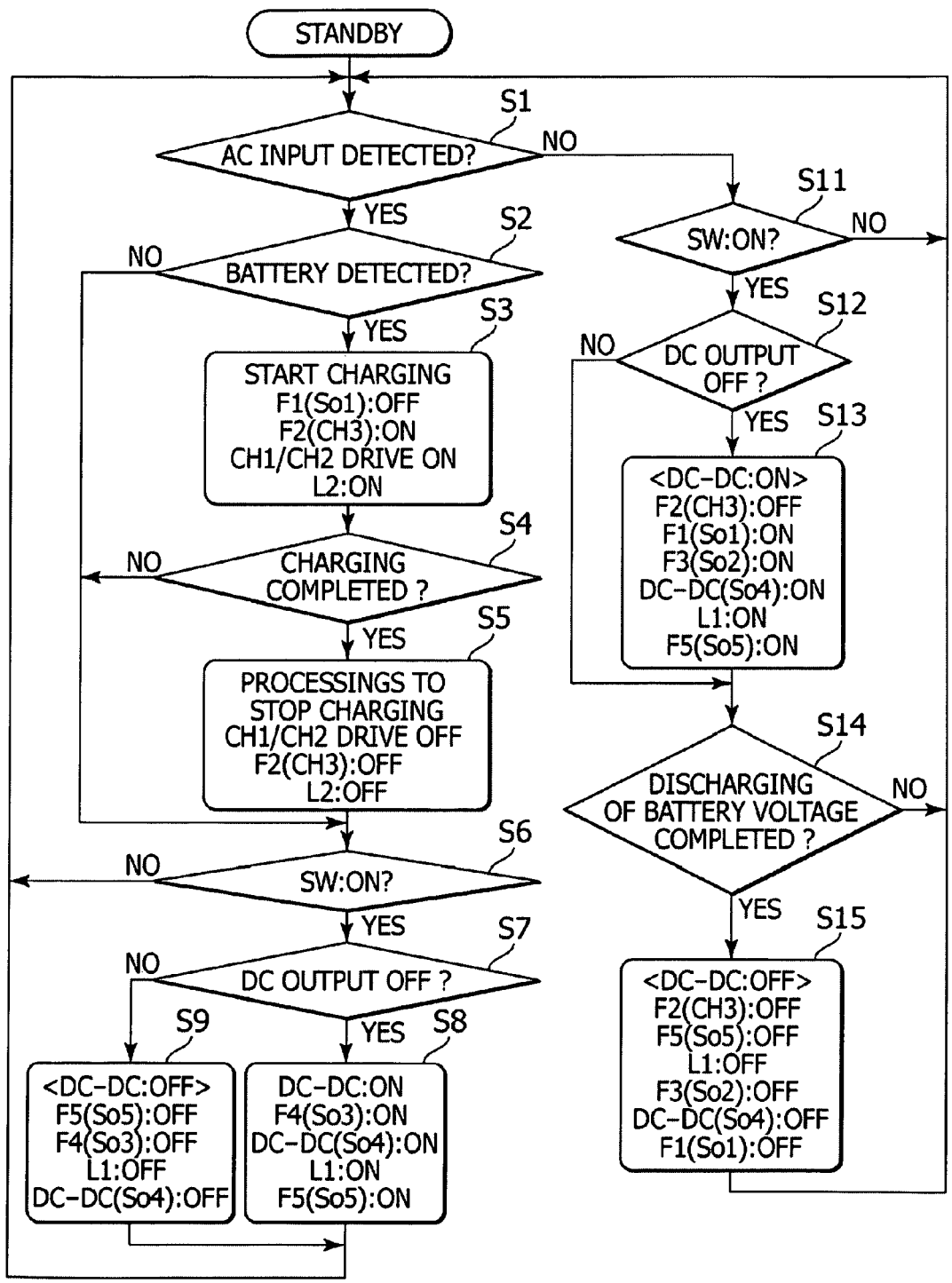
FIG. 5 is a flowchart for illustrating a process of operations in an embodiment.

A process of operations under the control of the controller 4 in an embodiment of the present invention is shown by a flowchart in FIG. 5. Whether there is an AC (commercial power supply) input is determined in step S1. Upon the determination of the presence of AC input, it is determined whether there are batteries (BAT1 and BAT2) in step S2. If no batteries are determined, a process advances to step S6 to determine ON/OFF of a mechanical switch SW.

If the presence of a battery is determined in step S2, a process advances to step S3 (charging is started). When the charging is started, the FET-F1 is turned OFF by the output So1 of the controller 4 (Indicated as "F1 (So1):OFF" in the description below and in FIG. 5). Operations are described similarly below. Operations of "F2 (CH3):ON, CH1/CH2 drive ON, L2 ON (lighting)" are performed sequentially in this order.

A battery voltage while charging is monitored to determine whether the charging is completed or not (step S4). When it is determined as the charging is not completed, a process advances to a step S6 for determining ON/OFF of the mechanical switch SW, and when determined as the charging is completed, processings for completing the charging are made in step S5. In other words, operations of "CH1/CH2 drive OFF, F2 (CH3):OFF, L2:OFF(switch off of a light)" are sequentially performed in this order.

If the mechanical switch SW is determined as not being turned ON in step S6, a process returns to step S1 to repeat the processings, and if the mechanical switch SW is determined as being turned ON, whether DC output is OFF or not is determined in step S7. When the mechanical switch SW is operated while a DC output is OFF, processings for turning ON the DC-DC converter 7 are performed in step S8. In other words, operations of "F4 (So3):ON, DC-DC converter (So4): ON, L1:ON, and F5 (So5):ON" are performed sequentially in this order.

If the mechanical switch SW is operated while a DC output is ON, processings for turning OFF the DC-DC converter 7 are performed in step S9. Namely, operations of "F5 (So5): OFF, F4 (So3):OFF, L1:OFF, DC-DC converter (So4):OFF" are sequentially performed in this order. Upon completion of processings in step S8 and S9, a process returns to the step S1 to repeat the operations.

Upon the determination of absence of AC input in step S1, whether the mechanical switch SW is ON or OFF is determined in step S11, and if the mechanical switch SW is determined to be ON state, whether a DC output is OFF or not is determined in step S12. When the DC output is in ON state, discharging of a battery voltage is determined to be completed in step S14.

If the mechanical switch SW is operated while a DC output is OFF, processings for turning ON the DC-DC converter 7 are performed in step S13. In other words, operations of "F2 (CH3):OFF, F1 (So1):ON, F3 (So2):ON, DC-DC converter (So4):ON, L1:ON, F5 (So5):ON" are sequentially performed in this order.

Upon completion of processings in step S13, whether discharging of a battery voltage is completed or not is determined in step S14, and if it is determined as the discharging is not completed, a process returns to step S1 to repeat the operations. When it is determined as the discharging is completed in step S14, processings for turning OFF the DC-DC converter 7 are performed in step S15. In other words, operations of "F2 (CH3):OFF, F5 (So5):OFF, L1:OFF, F3 (So2): OFF, DC-DC converter (So4):OFF, and F1(So1):OFF" are performed sequentially in this order.

Figure 6:
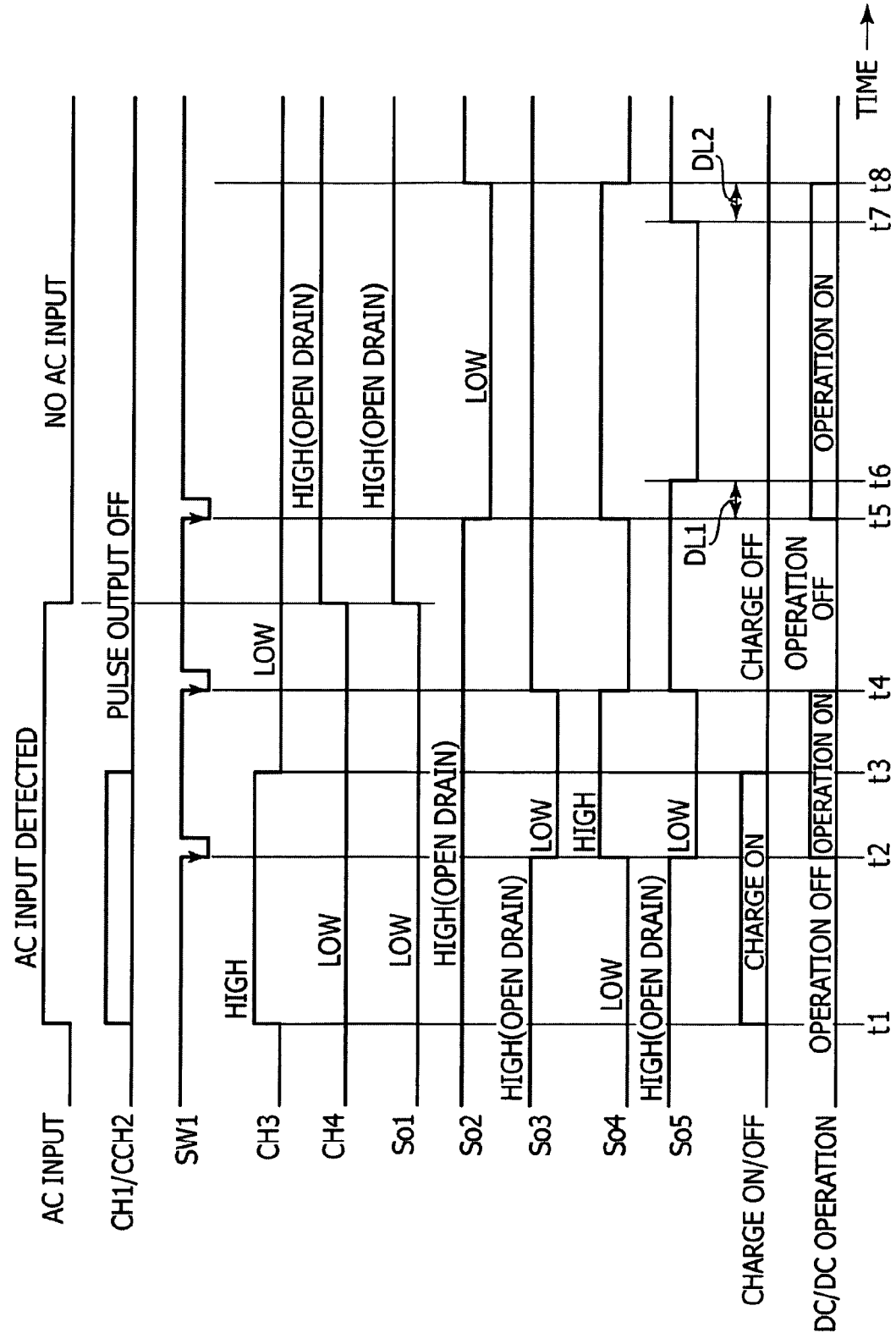
FIG. 6 is a timing diagram showing operations in an embodiment.

A timing diagram of operations in an embodiment is shown in FIG. 6. FIG. 6 shows a case where AC (commercial power supply) input is detected and a case where the AC input is not detected, and further indicates signal changes caused by operation of the mechanical switch SW in both cases. Switching of an AC input depends on whether an user connects an AC plug to an AC outlet. The signal SW1 for the controller 4 is changed to a low level when the mechanical switch SW is operated. The mechanical switch SW is turned ON or OFF when an user intends to use a DC output or the DC output is in OFF state after a use thereof.

A timing t1 in FIG. 6 indicates a start of charging, under the detection of an AC input (step S3 in FIG. 5). A timing t2 indicates a timing when the signal SW1 becomes low level under operation of the mechanical switch SW. The mechanical switch SW is operated while the operation of the DC-DC converter 7 is stopped, therefore, processings for starting the operation of the DC-DC converter 7 are performed (step S8 in FIG. 5), and a DC power supply is derived from an external DC power supply output terminal (USB port).

A timing t3 indicates the completion of charging, and accordingly, processings for completing charging (step S5 in FIG. 5) are performed.

At timing t4, the mechanical switch SW is operated while the DC-DC converter 7 is working under the detection of an AC input. In this case, processings to stop the operation of the DC-DC converter 7 (step S9 in FIG. 5) are performed to turn OFF a DC power of an external DC power supply output terminal (USB port).

At a timing t5, the mechanical switch SW is operated while the DC-DC converter 7 is not working under no detection of an AC input. In this case, processings for starting operations of the DC-DC converter 7 (step S13 in FIG. 5) are performed and a DC power is derived from an external DC power supply output terminal (USB port). Change in a signal So5 (signal for turning ON/OFF the FET-F5) is observed at a timing t6, at which delay time DL1 elapsed after the timing t5.

At a timing t7, no AC input is detected, and the end of discharging is detected while the DC-DC converter 7 is working. In this case, processings to stop operation of the DC-DC converter 7 (step S15 in FIG. 5) are performed to turn OFF a DC power of an external DC power supply output terminal (USB port). A signal So5 (a signal for turning ON/OFF the FET-F5) is changed at a timing t8 at which delay time DL2 elapsed after the timing t7.

Descriptions has been made for embodiments, but the present invention is not limited to the embodiments, but various modifications and applications are allowable without departing from the spirit and scope of the present invention. For example, three or more secondary batteries may be used, and in addition, secondary batteries other than nickel-metal-hydride secondary batteries, such as lithium-ion secondary batteries may be used. When lithium-ion secondary batteries are used, since battery voltages thereof are high, typically, a boost DC-DC converter may be used. Alternatively, combination of boost type and step down type of a DC-DC converter may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery charger for charging a plurality of secondary batteries, the battery charger being configured to be connected to a power supply circuit for converting an AC input to a DC output, and configured so that an output of the power supply circuit is connected to the plurality of secondary batteries, the battery charger comprising:
   a first switch for connecting the plurality of secondary batteries in series, the plurality of secondary batteries comprising a first secondary battery having a highest electric potential of the plurality of secondary batteries and a second secondary battery having a lowest electric potential of the plurality of secondary batteries;
   a second switch to selectively connect a first polarity terminal of the first secondary battery;
   a DC-DC converter having an input terminal connected to the first polarity terminal of the first secondary battery via the second switch,
   an external power supply input terminal connected to a second polarity terminal of the second secondary battery;
   an external power supply output terminal connected to an output terminal of the DC-DC converter to derive a stable power supply; and
   a controller for controlling the first and second switches; and further comprising a third switch for connecting the first polarity input terminal of the DC-DC converter to an output terminal of the power supply circuit, wherein:
   upon detection of the AC input, the controller controls the first and second switches to become OFF state and the third switch to becomes ON state, and a DC output of the power supply circuit is inputted to the first polarity input terminal of the DC-DC converter; and
   upon no detection of the AC input, the controller controls the first and second switches to become ON state and the third switch to becomes OFF state, and the plurality of secondary batteries is connected in series while a voltage of the highest electric potential of the secondary batteries is inputted to the first polarity input terminal of the DC-DC converter via the second switch.

2. The battery charger according to claim 1, further comprising a fourth switch to be turned ON/OFF by a manual operation, wherein the stable power supply is selectively derived to the external power supply output terminal by the fourth switch.

3. The battery charger according to claim 1, wherein the first switch is turned ON by an output voltage of the DC-DC converter after being turned ON by the controller.

4. The battery charger according to claim 1, wherein upon no AC input to the controller, an output voltage of the DC-DC converter is supplied as an operation voltage.

5. A battery charger for charging a plurality of secondary batteries and deriving a DC power generated by a DC-DC converter to an external DC power supply terminal, the battery charger being configured to be connected to a power supply circuit for converting an AC input to a DC output, and configured so that an output of the power supply circuit is connected to the secondary batteries, the battery charger is controlled by processings comprising the steps of:
   determining a presence or absence of AC input;
   upon the determination of the presence of AC input, determining whether an operation of the DC-DC converter is turned ON or not;

if the DC-DC converter is determined to be turned ON, supplying a DC power generated in the power supply circuit to an input terminal of the DC-DC converter and outputting an output power supply of the DC-DC converter to the external DC power supply terminal;

upon the determination of the absence of AC input, determining whether an operation of the DC-DC converter is turned ON or not;

if the DC-DC converter is determined to be turned ON, connecting the plurality of secondary batteries in series, supplying a voltage of a first secondary battery having a highest electric potential of the plurality of secondary batteries connected in series to an input terminal of the DC-DC converter, and outputting the output power supply of the DC-DC converter to the external DC power supply terminal;

detecting a completion of discharging of the plurality of secondary batteries; and upon a detection of the completion of discharging, stopping an output of the output power supply of the DC-DC converter and operation of the DC-DC converter.

* * * * *